United States Patent Office 3,636,182

Patented Jan. 18, 1972

3,636,182

PREPARATION OF STYRENES

George J. Kallos, Saginaw, and Che-I Kao, Midland, Mich., assignors to The Dow Chemical Company, Midland, Mich.

No Drawing. Filed Nov. 14, 1969, Ser. No. 877,002
Int. Cl. C07c *15/10*
U.S. Cl. 260—669 17 Claims

ABSTRACT OF THE DISCLOSURE

The vapor phase reaction for producing styrenes from toluenes and methyl chloride is promoted by methyl bromide, methyl iodide, hydrogen bromide, hydrogen iodide, bromine, and iodine.

BACKGROUND OF THE INVENTION

This invention relates to a novel process for producing styrenes from toluene or substituted toluenes and methyl chloride in vapor phase, at elevated temperatures, using methyl bromide, methyl iodide, hydrogen bromide, hydrogen iodide, elemental bromine or iodine as promoters for the reaction. The promoters can be used singly or in any combination.

Styrene and substituted styrenes are useful for making a variety of polymers and copolymers. The polymeric substances are useful in the production of molded articles, latex paints, synthetic rubbers, coatings and the like.

In copending application Ser. No. 745,399 filed July 17, 1968 in the name of George J. Kallos, now U.S. Pat. No. 3,494,469, there is described a process for making styrenes by reacting toluene or substituted toluenes with methyl chloride at 550–1200° C. to produce the corresponding styrenes.

SUMMARY OF THE INVENTION

It has now been found that if a .005 to .40 mole of a promoter of the type described, based on the moles of methylene chloride, is added to the reaction mixture containing a toluene of the formula

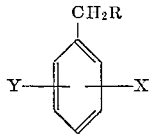

where R is H, CN or phenyl and one or both of X and Y is H, $CH_3$, $—CH=CH_2$, CN, NCO, F, Cl, Br, phenyl or $SO_2F$, and the mixture is heated to 550–1000° C., significant increases in conversion and yield of the desired styrene are obtained. The molar ratio of methyl chloride to the toluene can range from 0.5 to 40, but it is preferred that at least equimolar ratios and, more preferably, about 5 to 25 moles of methyl chloride per mole of toluene, be used for best results. The contact time will vary somewhat depending inversely on temperatures, but a range of .1 to 10 sec. is operable, and a range of .2 to 1.4 sec. is preferred.

The most desirable reaction temperature will also vary somewhat depending on the particular toluene compound used and the specific promoter employed. Usually, the conversion increases directly with increases in temperature, but above certain temperature range the specificity of the reaction is decreased. However, in spite of the fact that yields of desired product are somewhat lower at any temperature above the optimum, the total productivity per unit time may still be high because of increased conversion. The preferred temperature range is 650–850° C. and most preferred is a range of 650–800° C.

Reaction or residence time can be adjusted by varying the feed rates, by diluting the reaction mixture with inert diluents, or by changing the volume of the reaction zone, such as by using a reactor packed with inert solids. Preferably, the reaction mixture is diluted with a gas such as steam, nitrogen, argon or carbon dioxide. The term inert means that the substance referred to is substantially unreactive with any of the components in the reaction mixture or product of reaction under the conditions specified. Average residence time for this mixture in the reaction zone is preferably 0.1 to 10 seconds, more preferably about 0.5 to 3 seconds under the preferred temperature conditions. At the high temperatures of 1000–1200° C. a residence time of microseconds may be desirable to avoid excessive decomposition reactions. The reaction is preferably run at or about atmospheric pressure or at autogenous pressure. Subatmospheric or moderate superatmospheric pressure may be used. Since the reaction involves an increase in volume due to the production of HCl and other gaseous products, excessively high pressures are not desirable. Because of the production of HCl the materials of construction for the reaction system, particularly the reactor, should be resistant to the corrosive effects of HCl and the reactor should also resist elevated temperatures. Preferably, the reaction zone is filled with inert, heat and HCl resistant rings, balls, saddles of other form of packing to facilitate turbulence and heat exchange. However, the reactor can be an empty tube, if desired. The preferred material of construction is a ceramic or silica based material.

The reaction effluent contains the desired styrene, some unreacted toluene, unreacted methyl chloride and some promoter or a derivative thereof. The effluent is condensed and the overhead which contains the methyl halides, any unreacted HBr, $Br_2$, iodine or hydrogen iodide, small amounts of methane and the HCl formed in the reaction. The gaseous phase can be cooled to separate the hydrogen and methane as gases and the remainder can be liquified and can be recycled to the process. The liquid condensate obtained by condensing the reactor effluent can be subjected to known separation means to recover any unreacted toluene, which can be recycled, if desired, and to recover and purify the styrene compound such as by distillation or extraction or any other known means.

The examples which follow are intended to illustrate, but not to limit, the invention. All parts or percentages are by weight unless otherwise indicated.

EXAMPLE I

The reactor was a 75 cm. long high silica glass (Vycor) tube, with an inner diameter of 1.9 cm. It was operated with and without high silica glass rashig ring packing for control of contact time. The reactor was placed vertically in an electric furnace, having two heating sections, one 20 cm. and the other 55 cm. long. The 20 cm. section served as a vaporizer and preheater and the 55 cm. section as the reaction zone.

Liquid reactants and water, when steam was the diluent, were fed to the top by calibrated syringes. The gaseous components, the promoters, and nitrogen when used as the diluent, were also introduced into the preheater.

A portable on-site mass spectrometer was used for monitoring the reaction. A vapor phase chromatograph and infra-red spectroscope were also used to analyze and identify the products.

The reactor effluent was quenched with water or methylene chloride.

In this series of runs the diluent was nitrogen, the promoter was methyl bromide, the toluene was o-tolunitrile and the preheater temperature was held at about 500° C. for the first eleven runs and about 630° C. for the remaining runs. Tabulated below are the data obtained in the runs, including data from comparative tests in which no promoter was added.

EXAMPLE III

The equipment and general procedure of Example I were employed. In this series, m-tolylisocyanate was the toluene employed and the promoter was methyl bromide. Nitrogen was used as a diluent. Steam should be avoided because of the reactivity of the isocyanate group. The preheater temperature was held at about 560° C. for the first eight runs and at about 630° C. for runs 9 to 14, inclusive. Tabulated below are the data obtained in the tests, including the controls in which no promoter was used.

TABLE III

| Run | Reaction temperature, ° C. | $CH_3Cl$, moles/hr. | $CH_3Cl$/m-tolylisocyanate, molar ratio | $CH_3Br$/$CH_3Cl$, molar ratio | Contact time, sec. | Conversion, percent molar basis | Yield, percent Molar basis |
|---|---|---|---|---|---|---|---|
| 1 | 750 | 1.0 | 5 | 0 | 1.0 | 12.4 | 71.8 |
| 2 | 730 | 1.0 | 5 | 0 | 1.0 | 7.0 | 72.9 |
| 3 | 730 | 1.0 | 5 | 0.04 | 1.0 | 34.1 | 80.1 |
| 4 | 730 | 1.0 | 5 | 0.10 | 1.0 | 48.5 | 72.2 |
| 5 | 750 | 1.0 | 5 | 0.10 | 1.0 | 59.4 | 64.8 |
| 6 | 730 | 1.0 | 7.4 | 0.04 | 1.0 | 46.8 | 76.9 |
| 7 | 730 | 1.0 | 11.9 | 0.04 | 1.0 | 51.3 | 77 |
| 8 | 730 | 1.0 | 19.0 | 0.04 | 1.0 | 55.8 | 79.6 |
| 9 | 730 | 1.0 | 5 | 0 | 0.37 | 3.0 | 100 |
| 10 | 730 | 1.0 | 5 | 0.04 | 0.37 | 16.8 | 85.7 |
| 11 | 730 | 1.0 | 5 | 0.10 | 0.37 | 27.3 | 84.6 |
| 12 | 730 | 1.0 | 5 | 0.04 | 0.8 | 37.1 | 76.0 |
| 13 | 730 | 0.675 | 5 | 0.0 | 0.8 | 9.4 | 76.0 |
| 14 | 730 | 0.675 | 5 | 0.04 | 0.8 | 41.3 | 76.0 |

TABLE I

| Run | Reaction temperature, ° C. | $CH_3Cl$, moles/hr. | $CH_3Cl$/o-tolunitrile, molar ratio | $CH_3Br$/$CH_3Cl$, molar ratio | Contact time, sec. | Conversion, percent molar basis | Yield, percent molar basis |
|---|---|---|---|---|---|---|---|
| 1 | 650 | 1.12 | 7.7 | 0 | 1.3 | 2.5 | 100 |
| 2 | 700 | 1.12 | 7.7 | 0 | 1.3 | 5.0 | 100 |
| 3 | 725 | 1.12 | 7.7 | 0 | 1.3 | 10.4 | 97.1 |
| 4 | 725 | 1.12 | 7.7 | 0.045 | 1.3 | 36.7 | 82.3 |
| 5 | 725 | 1.12 | 7.7 | 0.090 | 1.3 | 46.7 | 76.4 |
| 6 | 725 | 1.12 | 7.7 | 0.180 | 1.3 | 59.1 | 61.1 |
| 7 | 725 | 1.12 | 7.7 | 0.223 | 1.3 | 61 | 50.7 |
| 8 | 725 | 1.12 | 12.4 | 0 | 1.3 | 9.7 | 97.9 |
| 9 | 725 | 1.12 | 20.0 | 0 | 1.3 | 9.9 | 96.0 |
| 10 | 725 | 1.12 | 32.0 | 0 | 1.3 | 11.0 | 100 |
| 11 | 725 | 1.12 | 3.1 | 0 | 1.3 | 3.8 | 92.8 |
| 12 | 730 | 1.12 | 5.0 | 0 | 0.3 | 1.6 | 100 |
| 13 | 730 | 1.12 | 5.0 | 0.09 | 0.28 | 24.9 | 89.6 |
| 14 | 730 | 1.12 | 5.0 | 0.09 | 0.38 | 31.3 | 85.0 |
| 15 | 730 | 1.12 | 5.0 | 0.15 | 0.37 | 36.1 | 74.2 |
| 16 | 760 | 1.12 | 5.0 | 0 | 0.39 | 6.0 | 100 |
| 17 | 760 | 1.12 | 5.0 | 0.09 | 0.39 | 37.6 | 79.5 |

EXAMPLE II

A series of runs was made with o-tolunitrile, and methyl chloride reactants and hydrogen bromide, bromine, iodine and methyl iodide as promoters. Nitrogen was used as a diluent and the preheater temperature was held at about 630° C. The equipment and general procedure was the same as described in the previous example. Tabulated below are the results obtained in these runs, including, two controls in which no promoter was used.

EXAMPLE IV

The reactor and procedural steps were the same as described in Example I. Nitrogen was used as a diluent, the promoter was methyl bromide, the toluene was α-tolunitrile

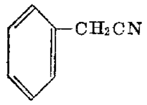

TABLE II

| Run | Reaction temperature, ° C. | $CH_3Cl$, moles/hr. | $CH_3Cl$/o-tolunitrile, molar ratio | Promoter | Promoter/$CH_3Cl$, molar ratio | Contact time, sec. | Conversion, percent molar basis | Yield, percent molar basis |
|---|---|---|---|---|---|---|---|---|
| 1 | 730 | 1.12 | 5 | ---------- | 0 | 0.3 | 1.6 | 100 |
| 2 | 730 | 1.12 | 5 | HBr | 0.066 | 0.28 | 22.5 | 95.1 |
| 3 | 730 | 1.12 | 5 | ---------- | 0 | 0.6 | 2.3 | 100 |
| 4 | 730 | 1.12 | 5 | $Br_2$ | 0.071 | 0.54 | 33.5 | 78.5 |
| 5 | 730 | 1.12 | 5 | $Br_2$ | 0.0276 | 0.57 | 17.1 | 87.1 |
| 6 | 730 | 1.12 | 5 | $Br_2$ | 0.0143 | 0.59 | 12.0 | 89.2 |
| 7 | 760 | 1.12 | 5.1 | $I_2$ | 0.018 | 0.56 | 53.8 | 65 |
| 8 | 730 | 1.12 | 5.1 | $I_2$ | 0.018 | 0.58 | 50.7 | 56.4 |
| 9 | 700 | 1.12 | 5.1 | $I_2$ | 0.018 | 0.59 | 47.8 | 69.0 |
| 10 | 700 | 1.0 | 5.1 | $CH_3I$ | 0.025 | 0.67 | 36.2 | 46.1 |
| 11 | 730 | 1.0 | 5.1 | $CH_3I$ | 0.025 | 0.66 | 47.8 | 55.9 |
| 12 | 765 | 1.0 | 5.1 | $CH_3I$ | 0.025 | 0.64 | 54.9 | 49.5 |

and the preheater temperature was 630° C. All data were taken from 730° C. reaction temperature runs. Tabulated below are the data obtained in the runs, including a control run.

TABLE IV

| Run | Reaction temperature, ° C. | $CH_3Cl$, moles/hr. | $CH_3Cl$ α-tolunitrile, molar ratio | $CH_3Br$/$CH_3Cl$, molar ratio | Contact time, sec. | Conversion, molar basis | Yield, percent molar basis |
|---|---|---|---|---|---|---|---|
| 1 | 730 | 1.15 | 5 | 0 | 0.5 | 6.5 | 61.5 |
| 2 | 730 | 1.15 | 5 | 0.148 | 0.59 | 75.1 | 91.3 |
| 3 | 730 | 1.15 | 5 | 1.048 | 0.47 | 66.7 | 89.9 |
| 4 | 730 | 1.15 | 5 | 0.148 | 0.28 | 41.9 | 92.8 |
| 5 | 730 | 1.15 | 5 | 0.148 | 0.35 | 58.7 | 93.4 |

EXAMPLE V

In these runs the furnace was inverted to provide a preheat zone 55 cm. long and a reaction of zone 20 cm. The promoter was methyl bromide, o-chlorotoluene was one reactant, the preheat temperature was held at about 630° C., nitrogen was used as a diluent and the reaction temperature in all instances was held at about 730° C. Tabulated below are the data obtained in the runs, including a control in which no promoter was employed.

TABLE V

| Run | $CH_3Cl$, moles/hr. | $CH_3Cl$/o-chlorotoluene, molar ratio | $CH_3Br$/$CH_3Cl$, molar ratio | Contact time, sec. | Conversion, percent molar basis | Yield, percent molar basis |
|---|---|---|---|---|---|---|
| 1 | 1.03 | 4.6 | 0 | 0.37 | 2.4 | 10 |
| 2 | 1.03 | 4.6 | 0.04 | 0.36 | 14.9 | 76.5 |
| 3 | 1.03 | 4.6 | 0.10 | 0.36 | 28.9 | 71.3 |
| 4 | 1.03 | 4.6 | 0.10 | 0.28 | 29.8 | 70.8 |
| 5 | 1.03 | 12.4 | 0.10 | 0.28 | 39.6 | 81.8 |
| 6 | 1.03 | 16.0 | 0.075 | 0.28 | 43.2 | 84.7 |

EXAMPLE VI

In these tests the first four runs were made with the heating furnace in the position described in Example V. The next four runs were made in an unpacked high silica glass tube which had a length of 75 cm. and an internal diameter of 0.9 cm., a preheat section of 20 cm. and a reaction zone of 55 cm. Runs 9–12, inclusive, were made in the 1.9 cm. inner diameter reactor. It had a preheat zone of 55 cm. packed with high silica glass Raschig rings and an unpacked reaction zone of 20 cm. The remaining runs were made in a reactor packed with high silica glass Raschig rings, a 20 cm. preheat zone and a 55 cm. reaction zone. The toluene was p-chlorotoluene, the diluent was nitrogen for the first three runs and steam for the remaining runs, the promoter was methyl bromide and the preheat temperature was held at about 630° C. in all instances. Tabulated below are the data obtained in these runs, including a control test.

TABLE VI

| Run | Reaction temperature, ° C. | $CH_3Cl$, moles/hr. | $CH_3Cl$/p-chlorotoluene, molar ratio | $CH_3Br$/$CH_3Cl$, molar ratio | Contact time, sec. | Conversion, percent molar basis | Yield, percent molar basis |
|---|---|---|---|---|---|---|---|
| 1 | 730 | 1.03 | 4.6 | 0 | 0.28 | 2.1 | 100 |
| 2 | 730 | 1.03 | 4.6 | 0.04 | 0.28 | 13.7 | 72.3 |
| 3 | 730 | 1.03 | 4.6 | 0.10 | 0.28 | 24.2 | 63.2 |
| 4 | 730 | 1.03 | 4.6 | 0.10 | 0.36 | 30.6 | 64.1 |
| 5 | 730 | 1.03 | 4.6 | 0.10 | 0.37 | 9.0 | 75.2 |
| 6 | 750 | 1.03 | 4.6 | 0.10 | 0.36 | 11.7 | 66.4 |
| 7 | 770 | 1.03 | 4.6 | 0.10 | 0.36 | 19.4 | 74.7 |
| 8 | 770 | 1.03 | 4.6 | 0.10 | 0.42 | 26.2 | 77.9 |
| 9 | 730 | 0.725 | 5 | 0.09 | 0.43 | 27.1 | 71.1 |
| 10 | 730 | 0.725 | 5 | 0.09 | 1.1 | 44.8 | 62.2 |
| 11 | 710 | 0.725 | 5 | 0.09 | 1.1 | 39.2 | 70.4 |
| 12 | 750 | 0.725 | 5 | 0.09 | 1.1 | 53.4 | 66.9 |
| 13 | 750 | 1.12 | 5 | 0.09 | 1.2 | 59.9 | 56.9 |
| 14 | 730 | 1.12 | 5 | 0.09 | 1.2 | 52.7 | 67.7 |
| 15 | 710 | 1.12 | 5 | 0.09 | 1.2 | 40.7 | 71.2 |

EXAMPLE VII

In these runs, steam was used as a diluent, p-fluorotoluene was a reactant, methyl bromide was the promoter and the preheat temperature was held at about 630° C. The reactor and its arrangement in the furnace was the same as described in Example I. Tabulated below are the data obtained in these runs, including a control test.

TABLE VII

| Run | Reaction temperature ° C. | $CH_3Cl$, moles/hr. | $CH_3Cl$/p-fluorotoluene, molar ratio | $CH_3Br$/$CH_3Cl$, molar ratio | Contact time, sec. | Conversion, percent molar basis | Yield, percent molar basis |
|---|---|---|---|---|---|---|---|
| 1 | 730 | 1.2 | 5 | 0 | 0.43 | 1.9 | 100 |
| 2 | 730 | 1.2 | 5 | 0.083 | 0.42 | 22 | 82.3 |
| 3 | 730 | 1.2 | 5 | 0.14 | 0.41 | 35.5 | 82.5 |
| 4 | 760 | 1.2 | 5 | 0.083 | 0.40 | 30.1 | 80.1 |
| 5 | 760 | 1.2 | 5 | 0.14 | 0.40 | 47.7 | 76.3 |
| 6 | 730 | 1.2 | 7.8 | 0.14 | 0.42 | 52.5 | 80.6 |
| 7 | 730 | 1.2 | 12.4 | 0.14 | 0.43 | 63 | 77.3 |

EXAMPLE VIII

The equipment and procedural steps were the same as described in the previous example. Steam was used as a diluent, toluene was a reactant, the promoter was methyl bromide, and the preheat temperature was held at about 630° C. Tabulated below are the data obtained in these runs. A control test is included.

TABLE VIII

| Run | Reaction temperature, ° C. | $CH_3Cl$, moles/hr | $CH_3Cl$/toluene, molar ratio | $CH_3Br/CH_3Cl$, molar ratio | Contact time, sec. | Conversion, percent molar basis | Yield, percent molar basis |
|---|---|---|---|---|---|---|---|
| 1 | 710 | 0.81 | 5 | 0 | 0.52 | 1.8 | 100 |
| 2 | 710 | 0.81 | 5 | 0.124 | 0.51 | 37.6 | 69.9 |
| 3 | 710 | 0.81 | 5 | 0.21 | 0.49 | 45.8 | 63.5 |
| 4 | 730 | 0.81 | 5 | 0.124 | 0.49 | 31.5 | 72.7 |
| 5 | 730 | 0.81 | 5 | 0.21 | 0.48 | 54.7 | 60.1 |
| 6 | 760 | 0.81 | 5 | 0.21 | 0.46 | 65.5 | 53.1 |
| 7 | 730 | 1.12 | 6.9 | 0.124 | 0.44 | 47.3 | 75.0 |
| 8 | 730 | 1.12 | 11.2 | 0.124 | 0.45 | 51.7 | 71.6 |
| 9 | 730 | 1.12 | 17.8 | 0.124 | 0.52 | 64.7 | 67.4 |

EXAMPLE IX

In this series of runs the equipment and procedural steps were the same as described in the previous example. p-Xylene was the substituted toluene used, steam was the diluent, the promoter was methyl bromide and the preheat temperature was 630° C. The main styrene product obtained was p-vinyl toluene and yields are reported for this compound. Small amounts of p-divinyl benzene were also obtained. The data obtained are tabulated below.

TABLE IX

| Run | Reaction temperature, ° C. | $CH_3Cl$, moles/hr. | $CH_3Cl$/p-xylene, molar ratio | $CH_3Br/CH_3Cl$, molar ratio | Contact time, sec. | Conversion, percent molar basis | Yield percent molar basis |
|---|---|---|---|---|---|---|---|
| 1 | 730 | 1.07 | 5 | 0 | 0.36 | 1.7 | 100 |
| 2 | 730 | 1.07 | 5 | 0.037 | 0.36 | 22.5 | 78.7 |
| 3 | 730 | 1.07 | 5 | 0.094 | 0.36 | 30.9 | 70.9 |
| 4 | 730 | 1.143 | 8.1 | 0.088 | 0.36 | 31.0 | 75.8 |
| 5 | 730 | 1.2 | 13.8 | 0.083 | 0.36 | 44.8 | 66.1 |
| 6 | 730 | 0.934 | 3.3 | 0.107 | 0.36 | 16.4 | 68.9 |
| 7 | 730 | 1.07 | 5 | 0.094 | 0.35 | 32.1 | 44.5 |

EXAMPLE X

Diphenyl methane was reacted in the equipment described in the previous example. The reactant was fed at a rate of .157 mole per hour, $CH_3Cl$ was fed at .116 mole per hour. The preheat temperature was held at about 630° C. and the reaction temperature was about 730° C. Residence time was calculated as 0.4 second. Steam at a feed rate of 2.2 moles per hour was used as a diluent. The methyl bromide-methyl chloride ratio was .14. The conversion of diphenyl methane was 40% and the yield of 1,1-diphenylethylene was 85%.

EXAMPLE XI

A mixture of 70% meta and 30% para-vinyltoluenes was reacted in the equipment described in Example X. Steam was the diluent, the promoter was methyl bromide and the preheat temperature was 630° C. The reaction temperature was controlled at about 730° C. for each run. A mixture of meta and para-divinylbenzenes was obtained in good yield with good conversion of the vinyltoluenes. No attempt was made to separate the divinyl isomers, but the presence of each isomer was confirmed by mass spectrography and V.P.C.

EXAMPLE XII

When o-bromotoluene is employed as a reactant, a side reaction occurs, whereby appreciable quantities of o-chlorostyrene are produced. In this test, .22 mole o-bromotoluene, 1.14 moles methyl chloride, 0.1 mole methyl bromide, and 1.54 moles of water were fed to the reactor. Preheat temperature was held at about 630° C. and the reaction temperature was maintained at about 730° C. Contact time was calculated as .43 second. On analysis of the effluent, it was found that 75.1% of the o-bromotoluene was converted. The o-bromostyrene recovered was about 11.5% of the total effluent and the o-chlorostyrene content was 20.5%. In addition, 53% o-chlorotoluene was present in the effluent.

EXAMPLE XIII

The toluene reacted was p-toluene sulfonyl fluoride. Nitrogen was the diluent. Preheat temperature was held at about 325° C. and reaction temperature was held at about 725° C. The methyl bromide-methyl chloride molar ratio was 1.4. The methyl chloride - p - toluene sulfonyl chloride molar ratio was 33 and the contact time was about .32 second. The equipment and general procedure was the same as described in Example I.

Good yields of p-vinyl benzene sulfonyl fluoride was obtained. The compound was identified by mass spectrography and intra-red spectroscopy.

EXAMPLE XIV

In this run p-tolylisocyanate was fed to the reactor with nitrogen as a diluent. The preheat temperature was about 500° C., and the reactor temperature was held at about 730° C. The equipment was that described in Example I. The methyl chloride-p-tolylisocyanate molar ratio was 5, the methyl bromide-methyl chloride ratio was .11 and the contact time was .44 second. Good yields of p-vinyl benzeneisocyanate were obtained. The compound identity was confirmed by mass spectrography and infra-red spectroscopy.

EXAMPLE XV

The equipment described in Example I was used for this run. Preheat temperature was held at about 600° C. and the reaction temperature was maintained at about 720° C. The toluene was p-cyanotoluene, the diluent was nitrogen. The methyl chloride-p-cyanotoluene molar ratio was 6.1 and the methyl bromide-methyl chloride molar ratio was .086. The residence time was .47 second.

p-Cyanostyrene, identified by mass spectrography and infra-red spectroscopy, was obtained in good yield.

We claim:

1. A method for making a vinylbenzene compound which comprises reacting by contacting in the vapor phase 0.5–40 moles of methyl chloride with a mole of a toluene compound of the formula

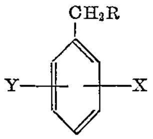

wherein R is H, CN, or phenyl and each of X and Y is H, CN, NCO, Cl, Br, F, $CH_3$, phenyl, $SO_2F$ or $$—CH_2═CH_2$$

and from about .005 to about 0.4 mole based on the methyl chloride of at least one of methyl bromide, methyl iodide, hydrogen bromide, bromine or iodine, at a temperature of from about 650 to about 1000° C.

2. The method of claim 1 wherein an inert diluent is added to the reaction mixture.

3. The method of claim 1 in which methyl bromide is added to the reaction mixture.

4. The method of claim 1 in which methyl iodide is added to the reaction mixture.

5. The method of claim 1 in which hydrogen bromide is added to the reaction mixture.

6. The method of claim 1 in which elemental bromine is added to the reaction mixture.

7. The method of claim 1 in which elemental iodine is added to the reaction mixture.

8. The method of claim 1 in which R is CN.

9. The method of claim 1 in which one of X and Y is CN and the other is H.

10. The method of claim 1 in which one of X and Y is Cl and the other is H.

11. The method of claim 1 in which X is NCO in the meta or para position and Y and R each is H.

12. The method of claim 1 in which one of X and Y is F and the other is H.

13. The method of claim 1 in which R, X and Y each is H.

14. The method of claim 1 in which R is H and one of X and Y is $CH_3$ and the other is H.

15. The method of claim 1 in which R is phenyl.

16. The method of claim 1 in which R is H and one of X and Y is $—CH═CH_2$ and the other is H.

17. The method of claim 1 in which one of X and Y is $—SO_2F$ and the other is H, and R is H.

References Cited

UNITED STATES PATENTS

| | | | |
|---|---|---|---|
| 3,219,711 | 11/1965 | Borkowski et al. | 260—669 |
| 3,303,229 | 2/1967 | De Rossett | 260—669 |

CURTIS R. DAVIS, Primary Examiner

U.S. Cl. X.R.

260—465, 539, 650